Feb. 20, 1962　　　J. McINROY　　　3,021,683
GAS LIQUEFIERS

Filed Jan. 18, 1960　　　　　　　　　　　3 Sheets-Sheet 1

Inventor
J. McInroy

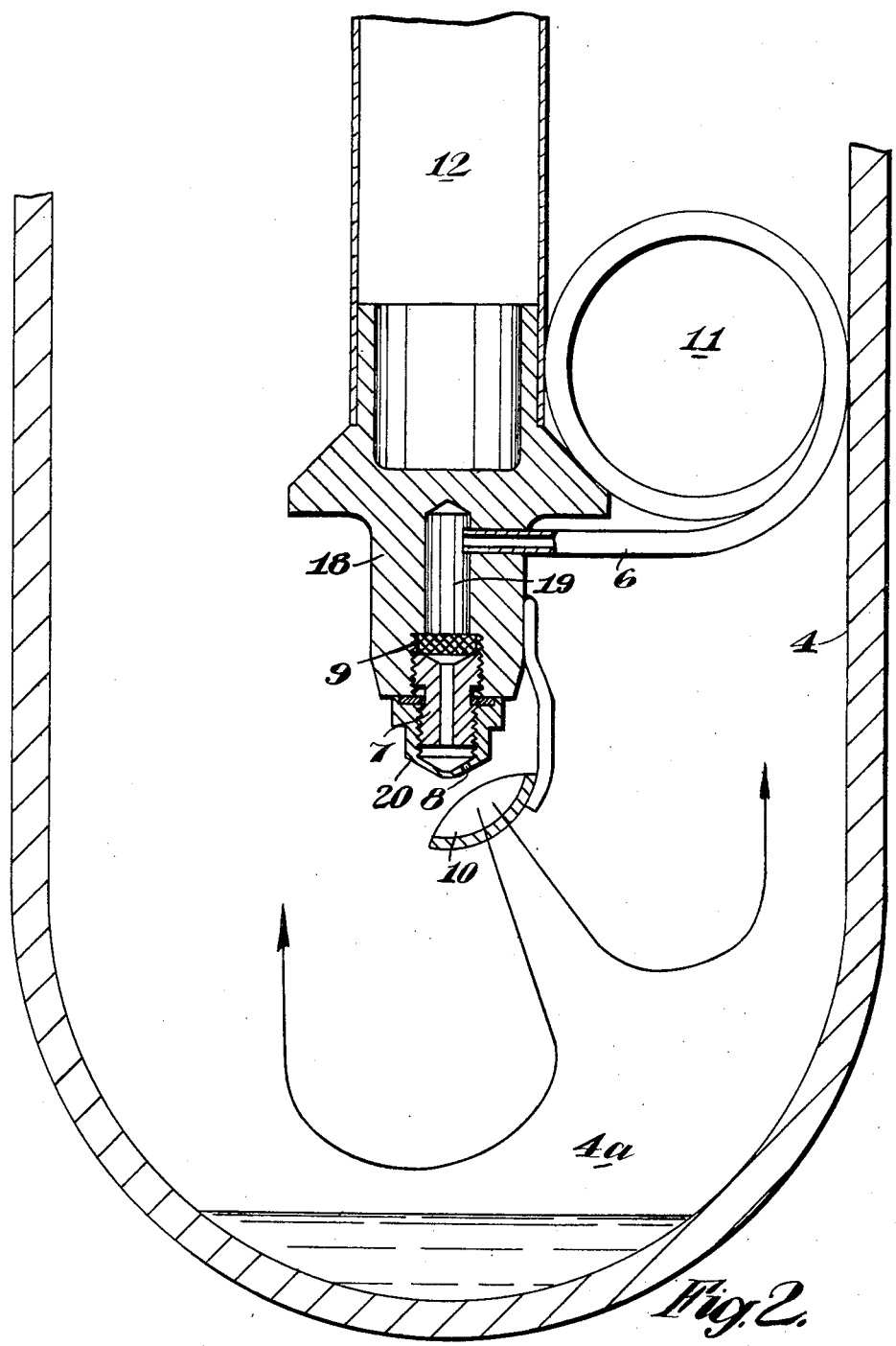

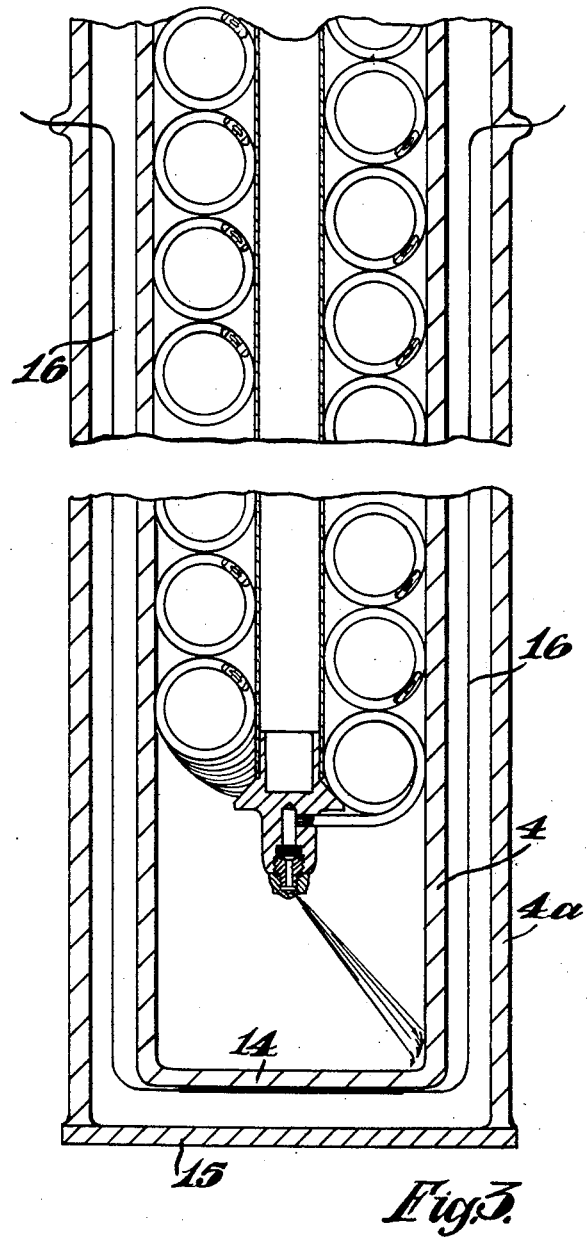

3,021,683
GAS LIQUEFIERS
John McInroy, Whitnash, Leamington Spa, England, assignor to The Hymatic Engineering Company Limited, Redditch, Worcestershire, England, a company of Great Britain
Filed Jan. 18, 1960, Ser. No. 2,964
Claims priority, application Great Britain Jan. 23, 1959
9 Claims. (Cl. 62—42)

This invention relates to gas liquefiers which operate at temperatures below −100° C. of the type wherein high pressure gas is led through a heat exchanger to a fixed orifice at which the gas expands to atmospheric or other pressure. The expanded gas, being colder than the incoming gas, due to isenthalpic expansion below the inversion temperature, is constrained to flow over the heat exchanger causing a progressive cooling of the gas to liquefaction. Small versions of this type of liquefier, wherein the orifice diameter is of the order of .001 inch to .020 inch have to operate on very dry gases otherwise foreign gases such as water vapour, carbon dioxide and oil vapours freeze at the orifice and cause blockage of gas flow which may be partial or complete.

The object of the invention is to prevent such partial or complete blockage and to provide a gas liquefier which is capable of maintaining a continuous and reliable flow of gas for long periods of time.

A further object of the invention is to provide means for reducing turbulence within the jet of liquid gas issuing from the expansion orifice.

According to the present invention there is provided a gas liquefier of the type referred to, including a porous membrane mounted between the heat exchanger and the orifice, as close to the orifice as possible, and arranged so that the high pressure gas passes through this porous membrane with a minimum of pressure drop, any foreign gases freezing in the said membrane, so preventing mechanical blockage of the orifice.

Preferably the membrane is made of a rigid porous substance for example sintered metal, wire mesh or ceramic material, and is in the form of a small thin disc having a diameter several times that of the orifice, for example about ten times. The bore of the orifice may be of the order of 0.003 inch.

Referring to the accompanying explanatory drawings:

FIGURE 2 is a sectional view drawn to an enlarged scale of part of the lower portion of FIGURE 1.

FIGURE 3 is a sectional view of a modified construction to be hereinafter described.

Figure 1:
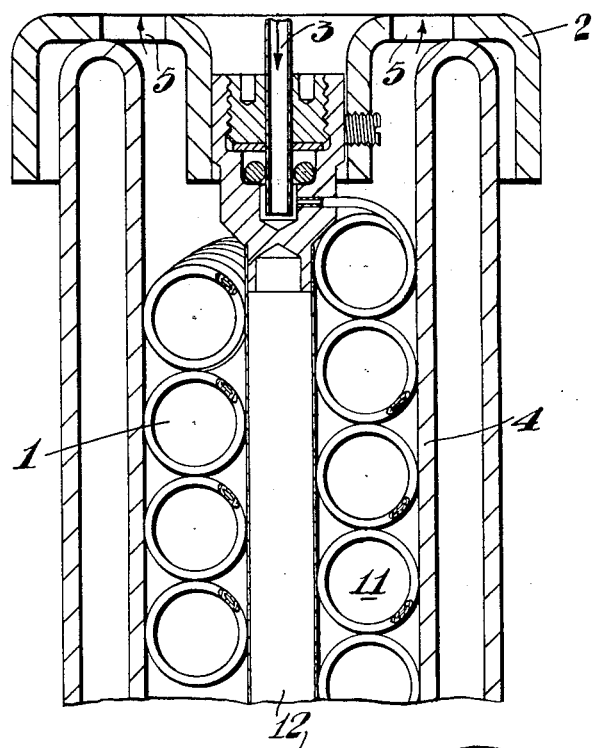
FIGURE 1 shows in sectional elevation a typical gas liquefier incorporating the present invention.
Figure 1:
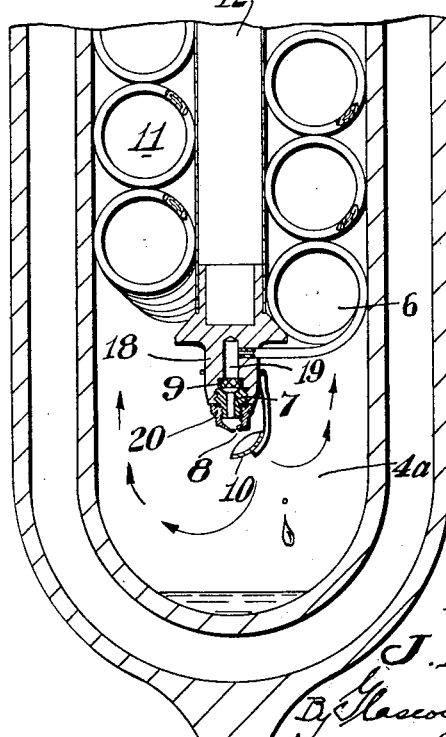

Preferred embodiment of the invention will now be described by way of example, with reference to the accompanying drawing which shows a typical gas liquefier in sectional elevation incorporating the present invention.

A heat exchanger 1, which is not shown in detail and may take the well known form of a great number of coils of narrow bore tubing indicated at 11, is carried by a supporting platform 2 which includes an inlet 3 for the gas to be liquefied and openings 5 to provide exhaust ports. The heat exchanger is suspended within a thermally insulated container 4, which may be in the form of a Dewar or similar flask and provides an expansion chamber 4a. There is a tube 12 of thermal insulating material within the coils of narrow bore tubing.

The heat exchanger 1 is connected via the end 6 of the tubular coils to a fitting 18 carried in the end of the tube 12. Within such fitting 18 is a passage 19 having a hollow screw 7 secured therein leading to the expansion orifice 8 in the cap 20 on the member 7. Such orifice 8 is preferably directed at an angle of between 30°–60° to the longitudinal axis of the apparatus for a purpose to be explained in more detail below. Between the tube 6 and the orifice 8 an adsorber 9 in the form of a porous membrane is mounted and held in position by the hollow screw 7. The adsorber is made of a rigid porous substance in the form of a disc. Sintered metal, wire mesh or ceramic materials have been found to be most satisfactory as porous substances. The adsorber is as thin as possible, compatible with ease of manufacture and mechanical strength, and its diameter is several times, for example about ten times, the bore of the expansion orifice.

Since the incoming gas is at high pressure, there will be a small or negligible drop in pressure across the thin adsorber because of the low linear velocity at the normal flow of gas expected.

In the operation of the apparatus, it is found that any foreign gases, for example, water vapour, carbon dioxide, or oil vapours, present in the gas to be liquefied freeze in the adsorber 9, that is they are prevented from reaching the orifice 8 where otherwise they would freeze and cause blockage. Due to the adsorber 9 being situated close to the expansion orifice 8, it attains a temperature approximating to that of the orifice. Thus any foreign gases having liquefying or freezing points above the liquid gas temperature form globules which are trapped by the adsorber.

The adsorber 9, has a pore size many times smaller than the bore of the expansion orifice 8, and preferably of the order of 5 microns. It has been found that the adsorber may continue to operate for a long period without becoming completely blocked. It is thought that trapped particles gradually migrate through the adsorber pores and break up into further particles, small enough to pass through the expansion orifice 8 without causing obstruction which prolongs the effective life of the adsorber. If moisture which freezes in the adsorber continues to build up until the adsorber is completely blocked thus putting the liquefier out of action, the liquefier should be removed from its container and allowed to return to ambient room temperature so that the ice will melt and vapourize. On reassembling the equipment, and with a renewed flow of high pressure gas, which of course will be initially at ambient temperature, any foreign gas vapours in the liquefier will discharge to atmosphere through the exhaust.

Thus the adsorber 9 permits a continuous and reliable flow of gas to be liquefied for relatively long periods of time, e.g. several hours. This is of considerable importance when, for example, certain cells in electronic equipment have to be kept at a low temperature (1° K. to 90° K.) for long periods of time. Furthermore, when cooling to low temperatures is required for only a brief period, the use of the adsorber enables a less dry gas to be employed than was hitherto possible.

In the use of photo-cells or similar equipment, where the sensitive coating has to be kept cold by liquefied gas, the photo-cell may be part of the Dewar flask or similar container 4. For example, as shown in FIGURE 3, both inner and outer members 4 and 4a of the flask may have flat circular portions 14, 15 respectively closing the ends of the cylindrical portions, the outer surface of the inner flat portion 14 being coated with the sensitive layer to be cooled and being connected to electrical conductors 16 which pass through the vacuum space and through the outer wall 4a as shown. However, it has been found that directing a stream of liquid gas straight on to the inner surface of the portion having the sensitive coating is detrimental to the smooth operation of the equipment. Thus for good thermal conduction, the inner wall having the sensitive coating is essentially thin and, if the jet of liquid-gas mixture is directed straight on to it, it will vibrate causing electrical disturbances. By arranging the orifice 8 as mentioned above in such manner that the issuing jet is at an angle between 30°–60° to the longitudinal axes, the liquid-gas mixture is made to play on the cylindrical wall and then spreads smoothly across the end surface to be cooled. Hence turbulence is greatly reduced and electrical disturbances are also reduced.

If it should be desired to collect the liquefied gas in the expansion chamber it is desirable to reduce liquid turbulence at any point in the chamber to as near zero as possible. This is effected by placing in front of the orifice 8 a slightly dished deflector or energy adsorber 10, so that the issuing jet strikes it normally and, in spreading across the surface, loses most of its velocity. A porous material such as wire mesh, sintered metal etc., is found to be most suitable for this deflector. By mounting the deflector as shown so that it can be turned about the longitudinal axis of the liquefier it can be brought into, or taken out of, action as desired.

What is claimed is:

1. A gas liquefier which operates at temperatures below —100° C. comprising, in combination, a heat exchanger, a supporting platform from which such heat exchanger is suspended, an inlet for the gas to be liquefied extending through said platform, a thermally insulated container around said heat exchanger, exhaust ports communicating with the space between the heat exchanger and container, a fitting towards the base of the liquefier having a short passage therein to which the end of the heat exchanger is connected, a part with a small bore expansion orifice therein at the lower end of said fitting, and a rigid porous adsorber in the form of a disc between the lower end of said passage and the said part and subjected to the temperature at the orifice, the adsorber having a pore size many times smaller than the bore of the expansion orifice and a diameter several times that of the expansion orifice so as to permit a continuous and reliable flow of gas to be liquefied for relatively long periods with a minimum of pressure drop, any foreign gases, present in the gas to be liquefied being frozen in said adsorber to thus prevent mechanical blockage of the orifice.

2. A gas liquefier as set forth in claim 1, in which the disc is made of a rigid porous material of the class sintered metal, wire mesh and ceramic material.

3. A gas liquefier as set forth in claim 1, in which the disc is in the form of a thin disc having a diameter several times that of the said expansion orifice.

4. A gas liquefier as claimed in claim 1, in which the disc has a pore size of the order of 5 microns.

5. A gas liquefier as set forth in claim 1, including deflecting means mounted in front of the orifice to reduce liquid turbulence caused by the issuing jet of liquefied gas.

6. A gas liquefier as set forth in claim 5, in which the deflecting means comprises a dished member of porous material, for example sintered metal or wire mesh.

7. A gas liquefier as set forth in claim 6, in which the dished member of porous material is so mounted that it can be moved into and out of the jet deflecting position.

8. A gas liquefier as set forth in claim 1, in which the end wall of the said container has on its outer surface a sensitive coating to be cooled, the jet first striking a side wall of the container before spreading across the surface to be cooled thereby reducing turbulence and hence disturbances at the sensitive coating.

9. A gas liquefier as claimed in claim 1, in which the heat exchanger is a coiled narrow bore tube with a tube of thermal insulating material located coaxially in the coils.

References Cited in the file of this patent
UNITED STATES PATENTS

| | | |
|---|---|---|
| 1,177,192 | Lavender | Mar. 28, 1916 |
| 2,242,173 | Buckley | May 13, 1941 |
| 2,576,610 | Konzog | Nov. 27, 1951 |
| 2,590,731 | Shawhan | Mar. 25, 1952 |
| 2,645,099 | Cumming | July 14, 1953 |
| 2,760,356 | Sixsmith | Aug. 28, 1956 |
| 2,791,105 | Aronson | May 7, 1957 |
| 2,895,303 | Streeter | July 21, 1959 |
| 2,968,160 | Schilling et al. | Jan. 17, 1961 |